United States Patent

Heering et al.

[11] Patent Number: 5,873,329
[45] Date of Patent: Feb. 23, 1999

[54] REFRACTORY LINING IN THE TRANSITION OF A GASIFIER TO THE WASTE HEAT BOILER

[75] Inventors: Jürgen Heering, Korschenroich; Klaus Köhnen, Mülheim, both of Germany; Duane Brooker, New York, N.Y.

[73] Assignee: MAN Gutehoffnungshütte Aktiengesellschaft, Oberhausen, Germany

[21] Appl. No.: 710,037

[22] Filed: Sep. 11, 1996

[30] Foreign Application Priority Data

Sep. 13, 1995 [DE] Germany .......................... 195 33 912.6

[51] Int. Cl.⁶ ...................................................... F27B 14/08
[52] U.S. Cl. ............................ 122/7 R; 432/248; 110/338
[58] Field of Search ................................. 122/7 R; 432/78, 432/79, 90, 238, 248, 251; 110/180, 338, 339, 340, 343

[56] References Cited

U.S. PATENT DOCUMENTS

| | | |
|---|---|---|
| 4,314,826 | 2/1982 | Vollhardt .................................... 122/32 |
| 4,453,475 | 6/1984 | Plöger . |
| 4,721,065 | 1/1988 | Mohrestecher et al. ................. 122/7 R |
| 4,900,249 | 2/1990 | McCollum et al. ..................... 432/248 |
| 4,948,387 | 8/1990 | Martin et al. . |
| 5,188,528 | 2/1993 | Rast ........................................ 432/248 |
| 5,277,580 | 1/1994 | Miskolszi, Jr. ........................... 432/251 |
| 5,445,658 | 8/1995 | Durrfeld et al. ......................... 122/7 R |
| 5,707,230 | 1/1998 | Kiss ........................................ 432/238 |

FOREIGN PATENT DOCUMENTS

| | | |
|---|---|---|
| 310 915 | 10/1973 | Australia . |
| 0 048 326 A2 | 3/1982 | European Pat. Off. . |
| 0 251 005 A1 | 1/1988 | European Pat. Off. . |
| 0 763 589 A1 | 9/1996 | European Pat. Off. . |
| 37 13 912 C1 | 7/1988 | Germany . |
| 195 33 912 A1 | 3/1997 | Germany . |
| 1 423 989 | 2/1976 | United Kingdom . |
| WO 97/10315 | 3/1997 | WIPO . |

*Primary Examiner*—Teresa J. Walberg
*Assistant Examiner*—Gregory A. Wilson
*Attorney, Agent, or Firm*—McGlew and Tuttle

[57] ABSTRACT

A refractory lining in the transition section of a gasifier to the waste heat boiler with claws/brackets for supporting refractory shaped bricks. Each claw is suspended on hooks in a pipe branch and is protected from overheating by cooling tubes. The refractory lining is supported in the tube bundle by brackets, which are arranged one on top of another and are welded to webs tube-web-tube welding of the tube bundle. The lower bracket at the cooling tube bundle and the horizontal tube wall are protected against clogging with slag by a refractory mass with a drip nose. Expansion joints are provided between the shaped brick segments under the brackets, whereas ring-shaped fiberboard segments are inserted above the claw.

10 Claims, 2 Drawing Sheets

REFRACTORY LINING IN THE TRANSITION OF A GASIFIER TO THE WASTE HEAT BOILER

FIELD OF THE INVENTION

The present invention pertains to a refractory lining in the transition section of a gasifier to the waste heat boiler with brackets for fastening refractory shaped bricks.

BACKGROUND OF THE INVENTION

Hot synthesis gas flows through the transition from the gasifier to the waste heat boiler, and this transition is also exposed to hot slag. The temperatures in this transition section are above 1,400° C.

An unprotected material consisting of steel is not resistant at these high temperatures and to the additional gas/solids flows. This area is therefore lined with a refractory material. It is possible to select between tamping clays, refractory shaped bricks, or a combination of these two materials, but the shaped blocks offer a better quality of material.

The transition between the reaction vessel and the synthesis gas cooler is lined with a refractory lining consisting of shaped bricks in a reaction vessel with a downstream waste heat boiler of a synthesis gas cooler, which was delivered by the applicant for the Ruhr synthesis gas plant (SAR) of Ruhrchemie in Oberhausen-Holten.

The upper shaped bricks are placed in an annular pattern on cast brackets, which are fastened one on top of another at the pipe end of the gasifier and at the pipe end of the synthesis gas cooler. The shaped bricks in the area of the cooling tube bundle are placed on circumferential tube noses at the transition from the vertical cooling tubes into the horizontal cooling tube wall.

Due to the refractory shaped bricks being supported by or lying on the circumferential noses of the cooling tube bundle, as well as due to a fixed point at the end of the gasifier pipe branch without additional expansion joints and elastic intermediate materials, the thermal stresses caused by high temperatures and the resulting movements of the refractory material are directly transmitted to the waterside high-pressure parts, e.g., the tubes of the cooling tube bundle; the entire own weight of the bricks also loads the supports. Furthermore, the upper fixed points (brackets) at the transition between the two vessels are not cooled and are exposed to increasing overheating as the wear of the refractory material progresses.

SUMMARY AND OBJECTS OF THE INVENTION

The object of the present invention is therefore to design the refractory lining in the transition section between the reactor and the synthesis gas cooler such that the stresses in the refractory material are reduced, the weight of the bricks themselves is distributed on different supports, the relative movements between refractory bricks and the brackets are compensated, abrupt cross section transitions are eliminated, the brackets are not fastened to water-carrying components (boiler tubes), and the so-called main claw is protected from overheating by an auxiliary cooling system.

According to the invention, a refractory lining structure is provided in the transition section of a gasifier to the waste heat boiler. The lining structure includes brackets for fastening refractory shaped bricks. Claws are suspended on hooks and are placed at an inlet pipe branch of the waste heat boiler. The cooling coil tubes are arranged in a sealing box underneath the claws. The brackets are fastened at spaced locations one on top of another in a cooling tube bundle. The refractory bricks placed in layers one on top of another are placed on the claws and the brackets.

According to the present invention, the refractory area consists of three different layers of bricks arranged next to each other in the uncooled pipe branch as well as of different special shaped bricks, shaped shoulder bricks, and straight bricks, which are adapted to the temperature, wear, internal and external pressure conditions, as well as to the service life.

The refractory brick lining is supported at the pipe branch and at the cooling tube bundle of the synthesis gas cooler by a brick-holding system. The holding system comprises brackets arranged one on top of another. These brackets are fastened at the webs of the tube-web-tube welding in the area of the cooling tube bundle and are suspended on claws in the area of the pipe branch and are additionally cooled there. The following requirements are met, among other things, by these measures according to the present invention:

the supports for the refractory bricks are distributed in different planes in order to distribute the weight of the bricks and thus to keep local stresses low, the compensation of the relative movements between the refractory bricks and the bracket structure is guaranteed by the use of an elastic ceramic material, abrupt cross section transitions in the transition are eliminated, the brick brackets are welded to the webs between the water-side high-pressure parts (boiler tubes), the main claw is protected from overheating by building in an auxiliary heating, the brick sizes and the design of the bricks are selected such that stresses in the bricks remain low, a drip nose is fashioned at the lower outlet of the cooling tube bundles in order to prevent slag from creeping along the horizontal wall and from clogging the tube bundle.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
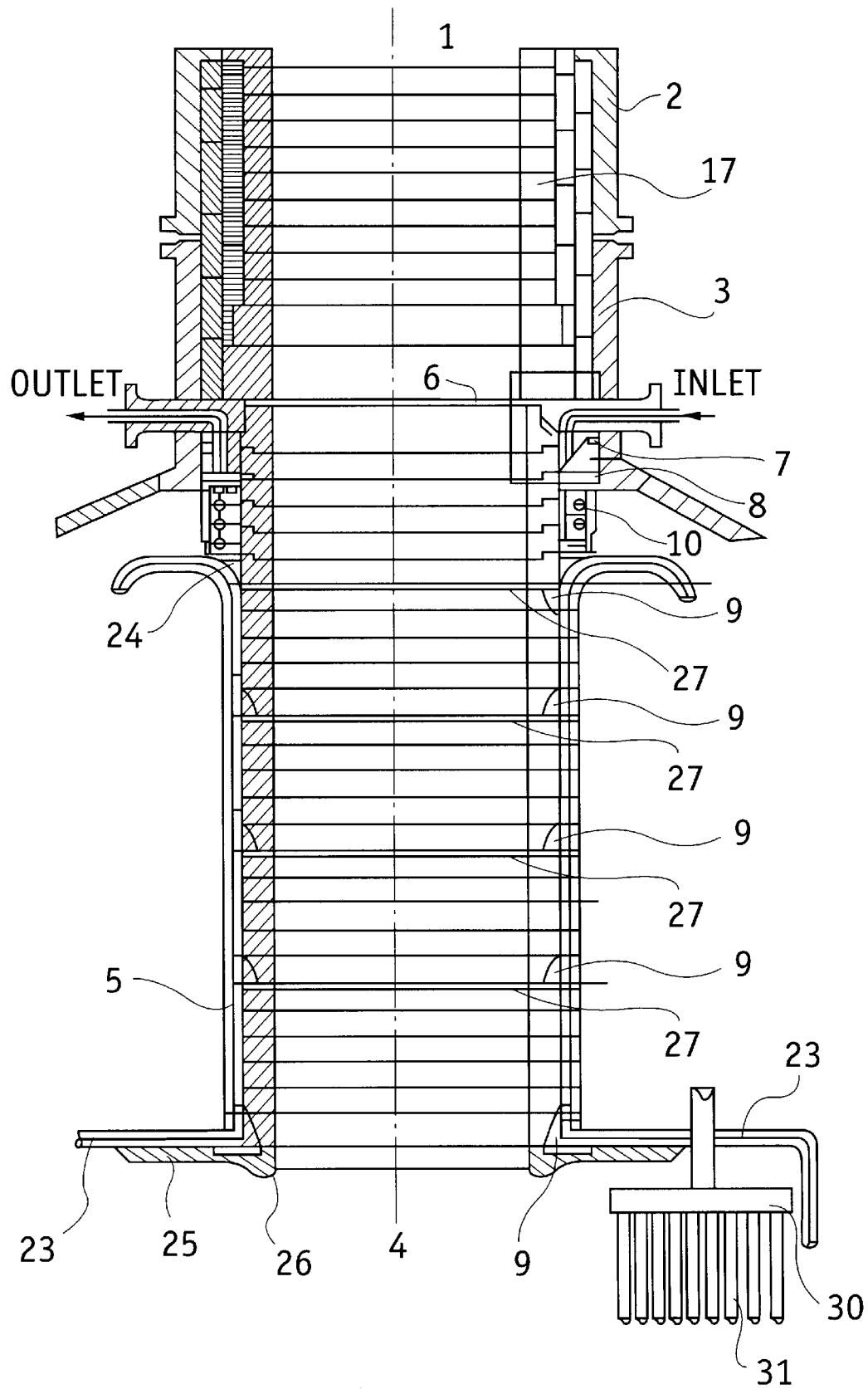
FIG. 1 is a sectional view through the transition between the gasifier and the waste heat boiler.

Referring to the drawings in particular, FIG. 1 shows a refractory lining, which comprises a series of straight and shaped bricks. This refractory lining is introduced on an inside in a transition section between the gasifier and the waste heat boiler.

On the outside, the transition section comprises the uncooled gasifier pipe branch 2 and the cooled tube bundle 5 in the upper part of the waste heat boiler 3, 4.

The refractory lining is supported in the tube bundle 5 by brackets 9, which are arranged one on top of another and are welded to the webs (tube-web-tube welding) of the tube bundle 5.

Connection hooks 7, into which claws 8, for supporting the upper refractory lining are introduced, are arranged in the pipe branch 3 of the waste heat boiler 4. The claws are protected from overheating by a cooling system with cooling tubes 10, and elements 11, 12.

The lowermost bracket 9 at the cooling tube bundle 5, the horizontal tube wall 23, the collector 30, and the tube wall 31 are protected from being clogged with slag by an additionally applied refractory mass 25 with a circumferential drip nose 26.

Expansion joints are provided between the shaped block segments 17 under the brackets 9, whereas a ring-shaped, ceramic fiberboard 6 is inserted at the transition region to the pipe branch 2 between the refractory linings. A refractory tamping clay 24 or the like is applied between the top part of the tube bundle 5 and the cooling system 10, 11, 12.

Figure 2:
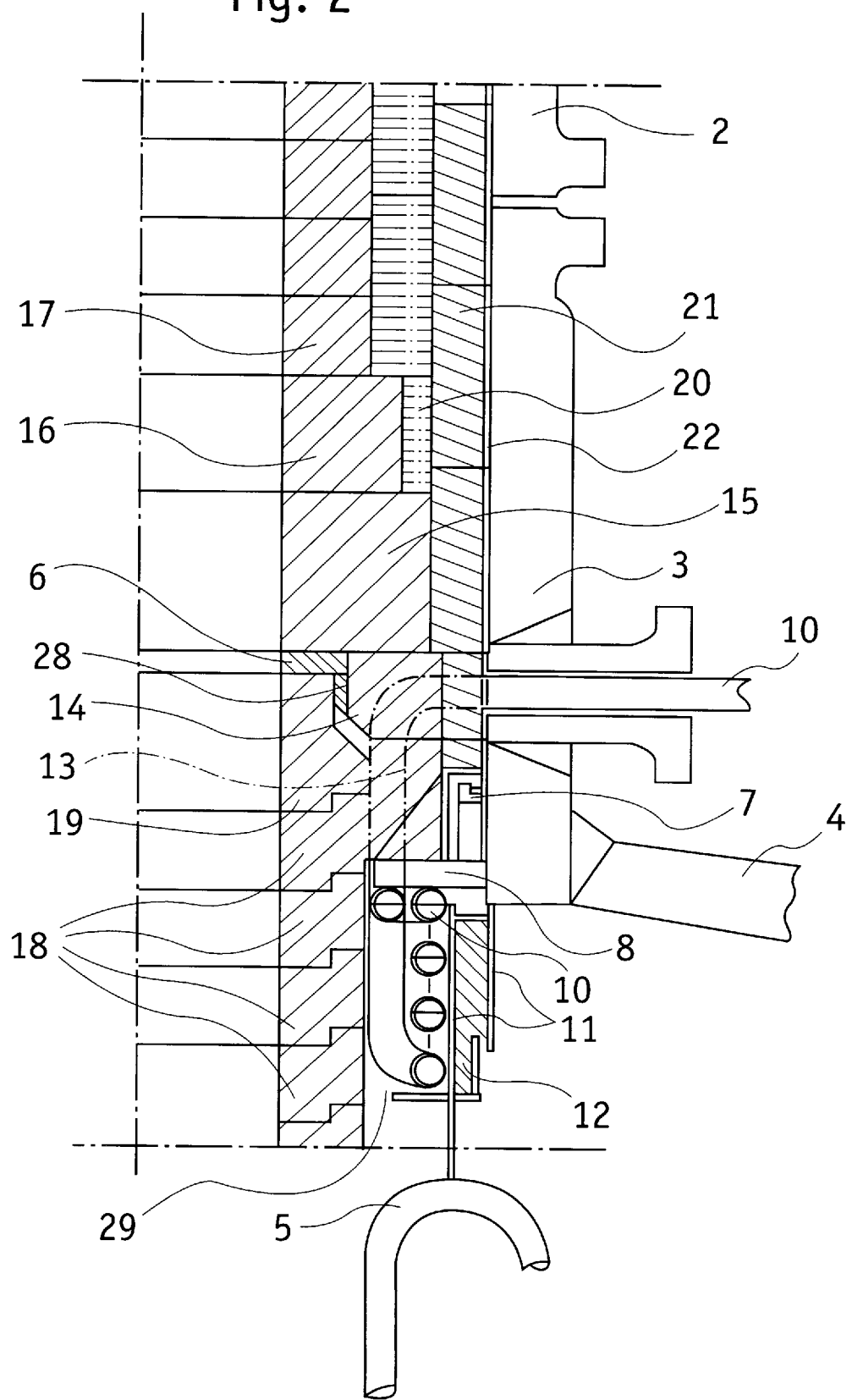
FIG. 2 is a sectional view through the refractory material at the transition from the gasifier to the waste heat boiler.

FIG. 2 shows the design of the refractory lining in the transition section from the gasifier pipe branch 2 to the inlet pipe branch 3 of the waste heat boiler 4. The refractory lining is held by claws 8, which are protected from overheating by a cooling system 10, 11, 12.

One layer of shaped bricks 13, 14 is first laid on the claws 8, the shaped bricks 18, 19 are used toward the middle, placing circular segments of a horizontally arranged ceramic fiberboard 6 on the brick 19 and a vertically arranged fiberboard 28 between the bricks 19 and 14. The bricks 15, 16 are arranged above them in one layer each, and these are topped by the bricks 17. Middle 20 and outer shaped bricks 21 as well as a ceramic mat 22 are additionally used for insulation.

While specific embodiments of the invention have been shown and described in detail to illustrate the application of the principles of the invention, it will be understood that the invention may be embodied otherwise without departing from such principles.

APPENDIX

Reference Numbers:
 1 Transition section
 2 Gasifier
 3 Inlet pipe branch of waste heat boiler
 4 Waste heat boiler
 5 Cooling tube bundle
 6 Ceramic fiber mat
 7 Hook
 8 Claw
 9 Bracket
 10 Cooling coil tubes
 11 Sealing box
 12 Ceramic wool
 13 Shaped brick
 14 Shaped brick
 15 Shaped brick
 16 Shaped brick
 17 Inner shaped brick
 18 Shaped shoulder brick
 19 Shaped shoulder brick
 20 Middle shaped brick
 21 Outer shaped brick
 22 Ceramic mat
 23 Horizontal tube wall
 24 Insulating mass
 25 Refractory tamping clay
 26 Drip nose
 27 Expansion joints
 28 Ceramic fiber mat
 29 Ceramic fiber mat block
 30 Collector
 31 Tube wall

What is claimed is:

1. A refractory lining structure in a transition section of a gasifier to the waste heat boiler, the waste heat boiler having an inlet pipe branch and an upper part with a cooling tube bundle, the structure comprising:

brackets for fastening refractory shaped bricks, said brackets being fastened at spaced locations one on top of another to the cooling tube bundle;

connection hooks arranged connected to the inlet pipe branch of the waste heat boiler;

claws suspended on said hooks;

a sealing box disposed underneath said claws;

cooling coil tubes arranged in said sealing box; and refractory bricks placed in layers one on top of another disposed on said claws and said brackets.

2. A refractory lining in accordance with claim 1, wherein said refractory bricks include a compound arrangement of shaped bricks placed one on top of another on the said claws.

3. A refractory lining in accordance with claim 2, wherein shaped shoulder bricks, a horizontally arranged ceramic fiberboard, and a vertically arranged ceramic fiberboard are disposed at a level of said shaped bricks toward a center.

4. A refractory lining in accordance with claim 2, further comprising middle shaped bricks and ceramic mats introduced between shaped bricks arranged on an inside and the said inlet pipe branch.

5. A refractory lining in accordance with claim 3, further comprising middle shaped bricks and ceramic mats introduced between shaped bricks arranged on an inside and the said inlet pipe branch.

6. A refractory lining in accordance with claim 1, wherein an expansion joint is provided between said refractory shaped bricks placed one on top of another on said brackets, under each said bracket.

7. A refractory lining in accordance with claim 6, wherein a refractory tamping clay with a said inwardly directed drip nose 26 is applied at a lower end of said cooling tube bundle and on an underside of said horizontal tube wall.

8. A refractory lining in accordance with claim 6, further comprising shaped shoulder bricks, wherein said shaped shoulder bricks are placed above said bracket coming out of said cooling tube bundle.

9. A refractory lining in accordance with claim 7, further comprising shaped shoulder bricks, wherein said shaped shoulder bricks are placed above said bracket coming out of said cooling tube bundle.

10. A refractory lining in accordance with claim 1, wherein ceramic fiber mat blocks are disposed around said cooling coil tubes.

\* \* \* \* \*